US012726824B2

(12) United States Patent
Sanctis et al.

(10) Patent No.: US 12,726,824 B2
(45) Date of Patent: Sep. 1, 2026

(54) AUTO-ADJUST APPLICATION OPERATION LEVERAGING LOCATION OF CONNECTED DEVICES

(71) Applicant: Bank of America Corporation, Charlotte, NC (US)

(72) Inventors: Jennifer Sanctis, Charlotte, NC (US); Srinivas Chavali, Charlotte, NC (US); Taylor Farris, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 166 days.

(21) Appl. No.: 18/939,689

(22) Filed: Nov. 7, 2024

(65) Prior Publication Data

US 2025/0063367 A1 Feb. 20, 2025

Related U.S. Application Data

(63) Continuation of application No. 17/745,947, filed on May 17, 2022, now Pat. No. 12,177,671.

(51) Int. Cl.
*G06F 21/00* (2013.01)
*G06F 21/32* (2013.01)
(Continued)

(52) U.S. Cl.
CPC ............ *H04W 12/35* (2021.01); *G06F 21/32* (2013.01); *H04W 12/63* (2021.01); *G06F 2221/2111* (2013.01)

(58) Field of Classification Search
CPC ........ H04W 12/35; H04W 12/63; G06F 21/32
See application file for complete search history.

(56) References Cited

U.S. PATENT DOCUMENTS 8,636,203 B1 1/2014 Patterson et al.
11,909,765 B2 2/2024 Ting et al.
(Continued)

OTHER PUBLICATIONS

Joshua Barrett, "How To Track A Car Using Your Phone," https://autochimps.com/track-car-using-phone/, Auto Chimps, Apr. 7, 2022.
(Continued)

*Primary Examiner* — Jeffrey C Pwu
*Assistant Examiner* — Thong P Truong
(74) *Attorney, Agent, or Firm* — Weiss & Arons LLP

(57) ABSTRACT

A system that dynamically adjusts an operation of software running on a first mobile device is provided. The system may include an application. The system may include an authentication module configured to authorize a user's login credentials, capture a biometric characteristic of the user, and authenticate the captured biometric characteristic based on a comparison to a stored biometric characteristic. The system may also include a tracking module configured to track a location of each of the plurality of mobile devices and based on the location, determine a number of mobile devices within a pre-determined range to the first mobile device. The system may include a throttling module configured to adjust the operation of the application based on the number of mobile devices, the adjusting including at least one of operating the application in read-only mode, partial-access mode and full-access mode and re-adjusting when a change in location is detected.

7 Claims, 8 Drawing Sheets

(51) Int. Cl.
*H04W 12/30* (2021.01)
*H04W 12/63* (2021.01)

(56) References Cited

U.S. PATENT DOCUMENTS

| | | | | |
|---|---|---|---|---|
| 2018/0098367 | A1* | 4/2018 | Pezdirc | H04W 76/14 |
| 2019/0342342 | A1* | 11/2019 | Ting | H04W 12/06 |

OTHER PUBLICATIONS

"Tile GPS Tracker Review—The Truth About Tile's Locator Bluetooth Tracker," https://www.advisoryhq.com/articles/tile-tracker-review/, Advisory HQ, Retrieved on Apr. 28, 2022.

"What is Beacon? A Beginners Guide To Bluetooth Beacon Technology," https://elainnovation.com/en/what-is-a-beacon-what-uses-in-the-industry/#:~:text=What%20is%20a%20beacon%3F,unique%20identifier%20to%20nearby%20devices, ELA Innovation, Nov. 26, 2020.

* cited by examiner

AUTO-ADJUST APPLICATION OPERATION LEVERAGING LOCATION OF CONNECTED DEVICES

CROSS REFERENCE TO RELATED APPLICATION

This application is a continuation of U.S. patent application Ser. No. 17/745,947 filed on May 17, 2022, and entitled "AUTO-ADJUST APPLICATION OPERATION LEVERAGING LOCATION OF CONNECTED DEVICES" which is hereby incorporated by reference herein in its entirety.

FIELD OF TECHNOLOGY

Aspects of the disclosure relate to adjusting operation of an application running on multiple mobile devices leveraging a connectivity of the devices.

BACKGROUND OF THE DISCLOSURE

Currently, there is a proliferation of mobile devices associated with any given individual. Most individuals own at least two mobile devices. Indeed, many individuals own three or more mobile devices. Mobile devices may include, but may not be limited to a smartphone, laptop, smartwatch and tablet.

There are many applications that an individual may launch on a mobile device. Some of these applications may be executed more often than other applications. There are some applications that may be launched a few times throughout a day. There are some applications that may be running continuously. For example, a banking app where an individual can view an account balance and/or perform transactions may be accessed many times throughout the day. Additionally, an individual's business app may be constantly running on the individual's mobile device.

These applications typically include both non-sensitive and sensitive private data. For security purposes, applications that are constantly open and running on a user's device are set up so that authentication may be required at predetermined periods throughout the day in order to protect the user's data.

Because of the number of devices belonging to an individual, a device may be easily misplaced or stolen. Since applications may be running continuously on these devices, the individual's data stored within these applications may be at risk if any one or more devices are misplaced or stolen.

It would be desirable to link each device to an application for keeping track of the location of each device. It would further be desirable to link each device to the application to enhance the security of the application and the data stored within the application.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
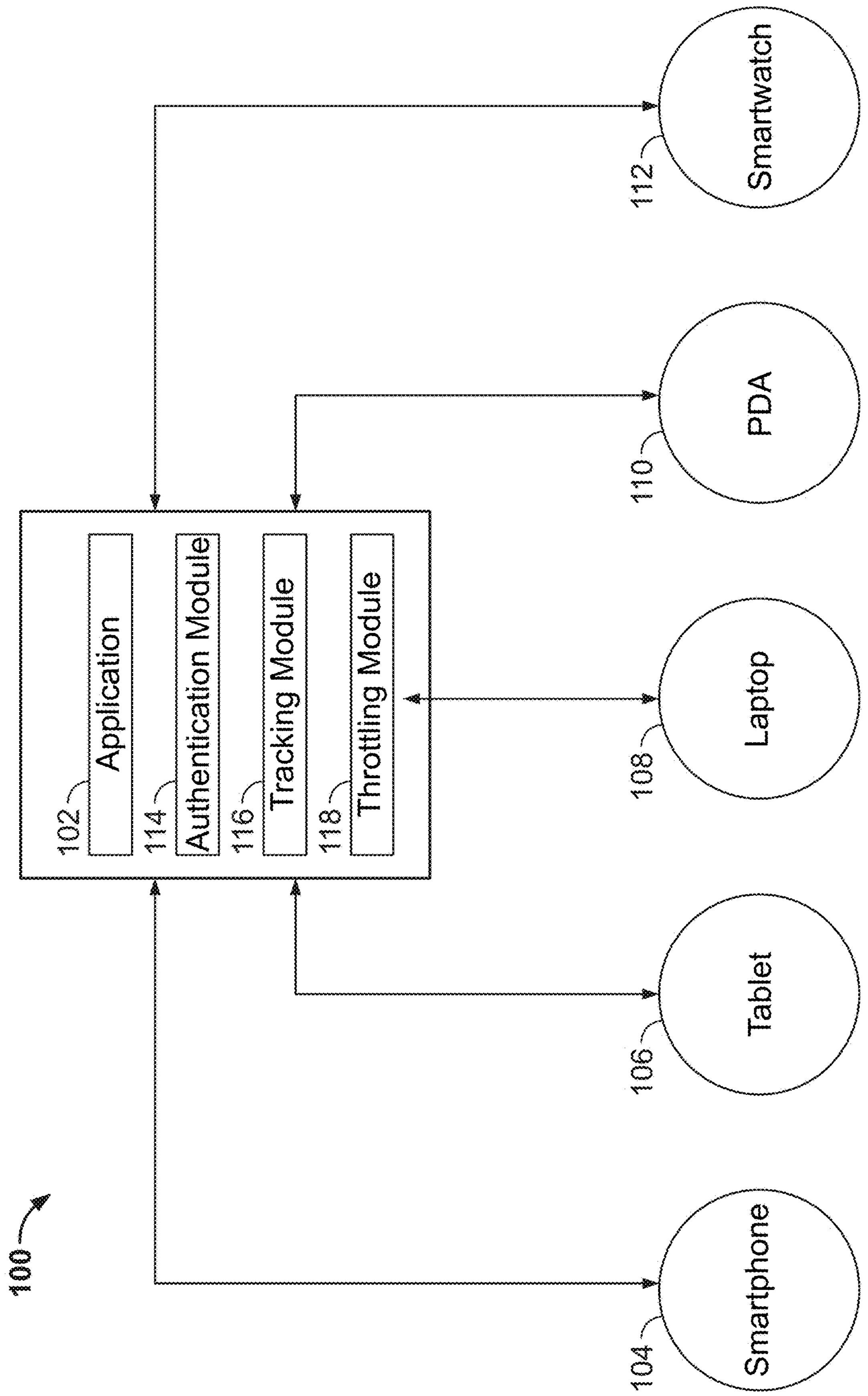
FIG. 1 shows an illustrative apparatus in accordance with principles of the disclosure.

A system that dynamically adjusts operation of software running on a mobile device is provided. The system may include an application that provides access to a service. The service may be a protected service. A protected service may be secured by a username and password or other credentials.

The system may include software. The software may be made up of multiple modules. A software module is a component of the software that is responsible for performing a target function. The software and its associated modules may be executed on a computer system. The computer system may include a mobile device. The computer system may include a plurality of mobile devices. The computer system may include a remote computer system. The computer system may be a network connected computer system.

The system may adjust the operation of software on a first mobile device. The first mobile device may be a part of a plurality of mobile devices. Each of the first mobile device and the remaining plurality of mobile devices may be linked to the application.

The system may include an authentication module. The authentication module may be configured to authorize a user to access the application. The authentication module may be configured to receive the user's login credentials on the first mobile device and authenticate the user based on the authorization of the login credentials. Login credentials may include a username and password. Login credentials may also include generating a one-time password ("OTP") and receiving input from the user of the OTP.

Following authorization of login credentials, the authentication module may be configured to capture a biometric characteristic of the user at the first mobile device. The authentication module may be further configured to compare the captured biometric characteristic to a biometric characteristic stored in a user profile within the application. A biometric characteristic may include an image of the user's face and detected using facial recognition. A biometric characteristic may include any one of a fingerprint, iris recognition, body movement and/or voice. The user of a user account within the application may have previously stored the user's biometric characteristics within the user account.

The authentication module may be further configured to authenticate the captured biometric characteristic based on the comparing.

In some embodiments, the authentication module may perform a comparison and determine that the captured biometric characteristic does not match the biometric characteristic stored in the user profile. When there is a discrepancy between the captured biometric characteristic and the stored biometric characteristic, the operational response of the application may be adjusted and activity may be paused from being performed within the application.

The authentication module may further be configured to log the user out of the application on the first mobile device and deny user-access to the application on the first mobile device.

The system may also include a tracking module. When the captured biometric characteristic matches the stored biometric characteristic, the tracking module may be configured to track a location of each of the plurality of mobile devices. Based on the location of each of the plurality of mobile device, the tracking module may be configured to determine a number of mobile devices that are within a pre-determined range to the first mobile device.

Each of the mobile devices may be paired to the application. The tracking of the location of each device may be performed using known methods for tracking and may use one or more of Bluetooth, Beacon, Wifi, NFC and GPS.

The tracking module may compare the location of each mobile device to the location of the first mobile device. The pre-determined range may be a distance close enough to the first mobile device that signifies that the mobile device is within close proximity to the user of the first mobile device. For example, if a user is holding a smartphone and logging into the application on the smartphone, any of the user's mobile devices that are either within reach of the user or within the same room/house/building as the user, may be considered within the pre-determined range.

The system may also include a throttling module. The throttling module may be configured to adjust the operation of the application based on the number of mobile devices determined to be within the pre-determined range.

The adjusting may include operating the app in one of three states. The three states may include a read-only mode, a partial-access mode and a full-access mode.

When the number of mobile devices within the pre-determined range is equal to zero, the throttling module may be configured to operate the application in read-only mode. When the number of mobile devices is equal to zero, this may indicate that the tracking module did not identify any additional mobile devices within the pre-determined range of the first mobile device.

When there are no devices identified within the pre-determined range, the application may be configured to operate in the read-only mode. Read-only mode may enable the user to view the data within the application. The user may not be enabled to input any data, upload data and/or perform any transactions. In some embodiments, read-only mode may enable only a partial view of the data. Some of the data may be blocked from the user's view.

When the number of mobile devices within the pre-determined range is equal to one, for example, the throttling module may be configured to operate the application in partial-access mode. When the number of mobile devices is equal to one, this may indicate that the tracking module identified one additional mobile device within the pre-determined range to the first mobile device. This may include a smartwatch on the user's arm. This may include identification of a laptop within close proximity to the user.

When operating in partial-access mode, the user may, in some embodiments be enabled to read data and perform transactions that are equal to or below a pre-determined value. Large transactions may be disabled in partial-access mode. In other embodiments, partial-access mode may enable the user to perform a limited set of transactions.

When the number of mobile devices within the pre-determined range is greater than one, the throttling module may be configured to operate the application in full-access mode. When the number of mobile devices is greater than one, this may indicate that more than one mobile device has been identified to be within the pre-determined range to the user.

When operating in full-access mode, the user may read, upload and perform all transactions.

The tracking module may be further configured to periodically re-track the location of each of the plurality of mobile devices while the user is logged into the application on the first mobile device. Re-tracking of the location may enable identification of a change in the status of any given mobile device. The user may misplace a mobile device. Additionally, someone may have stolen one of the devices while within range of the first mobile device.

In order to protect the application and the data within the application, continuously monitoring the location of each mobile device may enhance the protection and security of the app and the data.

When any change in location is detected, the throttling module may be further configured to re-adjust the operational response based on the change.

In some embodiments, when the tracking module identifies one or more mobile devices to be outside the pre-determined range, the tracking module may further identify whether the location of any of the one or more mobile devices is within a pre-defined range of acceptable locations for the mobile device. The application may store a profile for each mobile device which includes acceptable locations for each mobile device For example, a user's laptop may not always be within the user's proximity. However, it may be acceptable for the user's laptop to be either in the user's car or home. This may apply to each of the user's mobile devices.

Therefore, when one or more mobile devices are determined to be within the pre-defined range of acceptable locations, the tracking module may be configured to readjust the number of mobile devices to include the one or more mobile devices that are within the pre-defined range of acceptable locations.

Following the readjusting, the throttling module may be further configured to readjust the operational response based on the readjusted number of mobile devices.

A method for dynamically adjusting an operational response of an application running on a first mobile device is provided. The first mobile device may be a part of a plurality of mobile devices. The first mobile device and the plurality of mobile devices may each be linked to the application. In some embodiments, each mobile device may be linked to the application and each mobile device may be linked to each other.

The first mobile device and the plurality of mobile devices may be linked to the application following a registering of each of the mobile devices to the application. The registering of each of the devices may include pairing each mobile device to the application. The pairing may be enabled, but may not be limited to, one of Wifi, Beacon and Bluetooth.

Following the pairing, the method may include generating a profile for each mobile device. The profile may include an authentication ID for each mobile device. The profile may also include a pre-defined range of acceptable locations for each mobile device. This may include a specification of ranges of locations and specific locations that are acceptable for the mobile device. The method may further include storing the profile in an application database. The profile for each mobile device may be stored within a user profile. The user profile may be a profile of the user that may possess the plurality of mobile devices.

The method may include logging into the application on the first mobile device. The logging may be enabled following authorization of a user's login credentials.

Prior to authorizing user-access to the application on the first mobile device, the method may include capturing a biometric characteristic of a user of the first mobile device and comparing the captured biometric characteristic to a biometric characteristic stored in a user profile within the application.

The method may further include authenticating the captured biometric characteristic based on the comparing.

When the captured biometric characteristic does not match the stored biometric characteristic, the method may include logging the user out of the application on the first mobile device and denying user-access to the application on the first mobile.

Following authentication of the captured biometric characteristic, the method may include tracking a location of each of the plurality of mobile devices in comparison to the first mobile device.

Based on the location of each mobile device, the method may include determining a number of mobile devices that are within a pre-determined range to the first mobile device.

Based on the number of mobile devices determined to be within the pre-determined range, the method may include adjusting the operational response of the application.

In some embodiments, prior to adjusting the operational response, when any one or more mobile devices are determined to be outside the pre-determined range of the first mobile device, the method may include comparing the location of the one or more mobile devices to the pre-defined range of acceptable locations of each mobile device stored in the profile.

Following the comparing, when one or more mobile devices are within the pre-defined range of acceptable location, the method may include readjusting the number of mobile devices to include the one or more mobile devices that are within the pre-defined range of acceptable locations.

When one or more mobile devices are outside the pre-defined range of acceptable locations, the method may include denying user-access to the application from the one or more mobile devices determined to be outside the pre-defined range of acceptable locations.

The method may further include, in response to the determination that one or more mobile devices are outside the pre-determined range and outside the pre-defined range of acceptable locations, transmitting an electronic communication to the user of the first mobile device alerting the user of the one or more mobile devices determined to be outside the pre-defined range of acceptable locations.

By alerting the user of the first mobile device, this may enable the user to be aware that one of the user's devices is either misplaced or stolen.

Based on the number of mobile devices, the method may include adjusting the operational response of the application accordingly.

The operational response may provide a mode of user-access to the application. The adjusting may include at least one of operating the application in read-only mode, partial-access mode, or full-access mode.

When the number of mobile devices within the pre-determined range is equal to zero, the method may include operating the application in read-only mode.

When the number of mobile devices within the pre-determined range is equal to one, the method may include operating the application in a partial-access mode.

When the number of mobile devices within the pre-determined range is greater than one, the method may include operating the application in a full-access mode.

Following the adjusting of the operating, the method may include periodically re-tracking the location of each mobile device while the user is logged into the application on the first mobile device.

When a change in the location is detected, the method may include re-adjusting the operational response based on the change.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative apparatus 100. Apparatus 100 may include application ("App") 102 and mobile devices 104-112. Mobile devices may include a smartphone 104, a tablet 106, a laptop 108, a personal digital assistant ("PDA") 110 and smartwatch 112.

App 102 may provide access to a service. The service may be a protected service. App 102 may be linked to a cloud-based application server.

Each of mobile devices 104, 106, 108, 110 and 112 may be directly linked to app 102 and the cloud-based application server. Each of mobile devices 104-112 may be a registered device of the app and may be paired to the app and cloud-based application server.

App 102 may be downloaded on each of mobile devices 104-112. A user of the mobile devices may be enabled to access the app from any of the mobile devices. Initial access to the app may be based on authorization of a username and password.

Authentication module 114, tracking module 116 and throttling module 118 may be software modules also installed on each of mobile devices 104-112. Modules 114, 116 and 118 may also be linked to the cloud-based application server.

Figure 2:
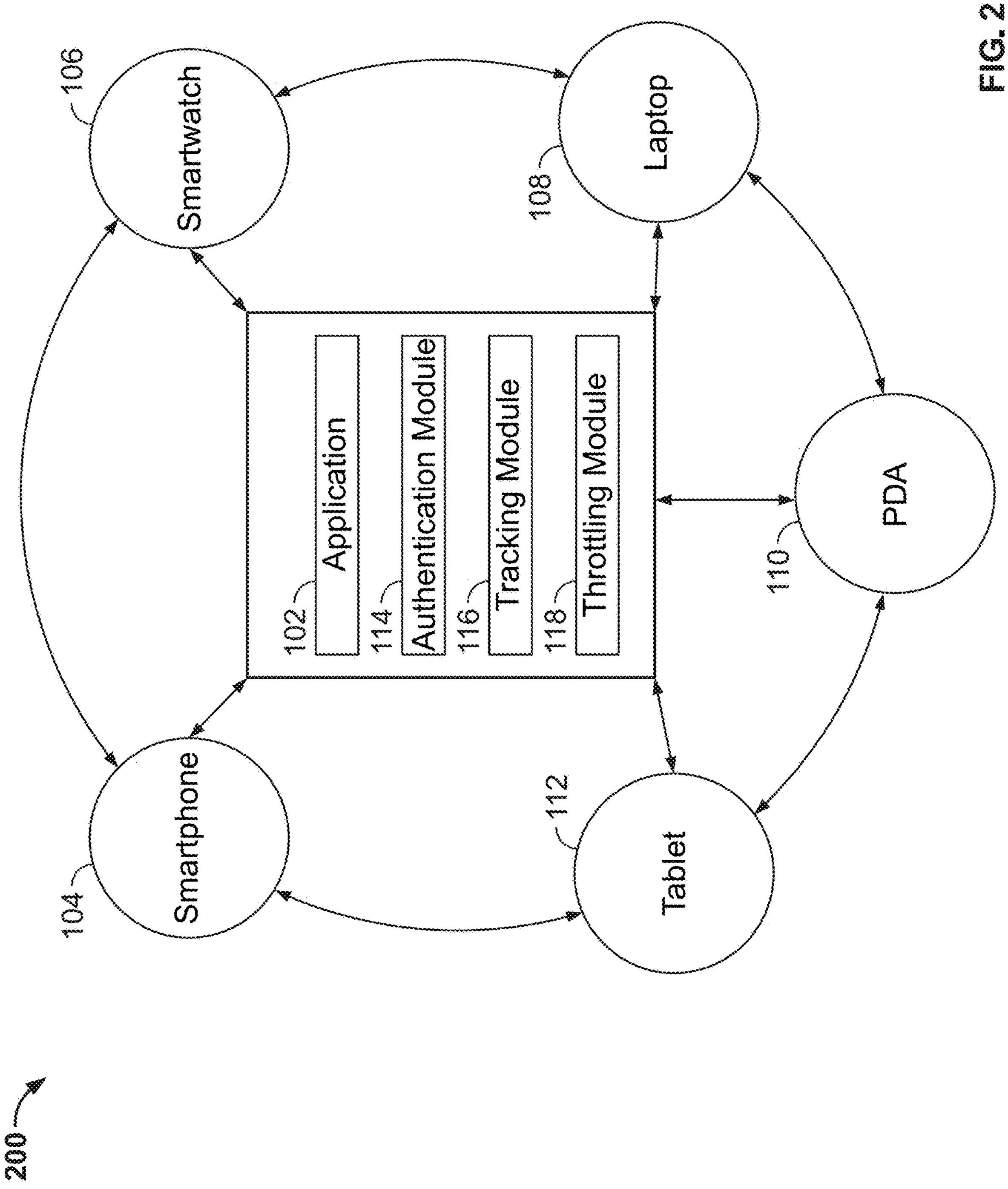
FIG. 2 shows an illustrative apparatus in accordance with principles of the disclosure.

FIG. 2 shows illustrative apparatus 200. FIG. 2 shows apparatus illustrated in FIG. 1. Apparatus in FIG. 2 supports additional electronic connections relative to apparatus shown in FIG. 1.

In FIG. 2, in addition to each of mobile devices 104, 106, 108, 110 and 112 being in electronic communication with app 102, each of mobile devices 104-112 may be electronically paired and/or otherwise in electronic communication with one another. Although FIG. 2 shows each mobile device in communication with two other mobile devices, it is to be understood that each mobile device may be in communication with three, or more, or all of the mobile devices illustrated in FIG. 2.

Application 102 may include authentication module 114, tracking module 116 and throttling module 118. Additionally, some or all of mobile devices 104, 106, 108, 110 and 112 include authentication module 114, tracking module 116 and throttling module 118. This may enable the mobile devices to monitor the activity and/or the location of one or more of the other mobile devices. This monitoring may be used to confirm the results of the tracking performed by application 102 as described herein.

In other embodiments, the monitoring may be used in place of the monitoring of application 102. For example, a first mobile device may monitor a second mobile device in place of application 102 when, for example, application 102 loses electronic communication with the second mobile device. The first mobile device may report back to application 102 data associated with the location of the second mobile device.

Each of devices 104-112 may be enabled to track a location of the other mobile devices. Each of devices 104-112 may identify a change of location and may alert the user of the device of the change.

Figure 3:
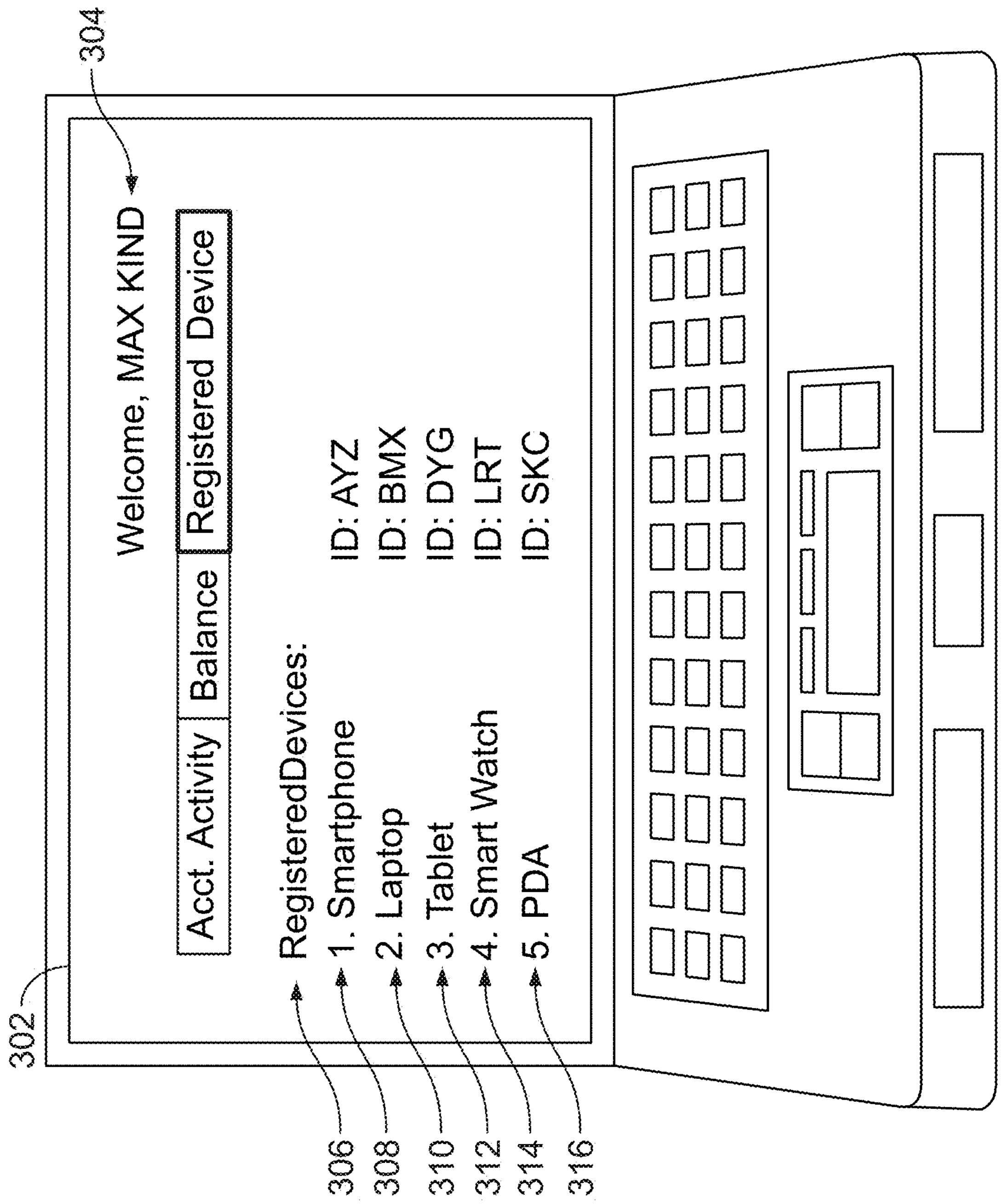
FIG. 3 shows an illustrative diagram in accordance with principles of the disclosure.

FIG. 3 shows an illustrative diagram of a user interface ("UI") 302. UI 302 may be a UI associated with app 102. UI 302 is shown displaying mobile devices registered within a user's account within app 102.

UI 302 may display account details of user 304 'Max Kind.' As displayed in UI 302, user 304 may own numerous mobile devices. Each of the mobile devices may be paired with app 102 and data associated with each of the mobile devices may be stored within an application database of app 102. The registered devices list 306 may be displayed within UI 302 under the 'registered devices' tab.

Mobile devices of user 304 include smartphone 308 with an authentication ID of 'AYZ.' Laptop 310 is another device of user 304 with an authentication ID of 'BMX.' Tablet 312 with an authentication ID of 'DYG' is another device of user 304.

User 304 also owns a smart watch. Smart watch 314 with an authentication ID of 'LRT' is another device of user 304. PDA 316 is another mobile device of user 304 with an authentication ID of 'SKC.'

When app 102 and any one of authentication module, tracking module and throttling module are operating, each of mobile devices 308-316 may be accessed via the associated authentication ID.

App 102 may be an online banking ("OLB") application that may be used to access a protected service. Apps, such as OLB 102 may provide access to financial information and must therefore be a protected service that is secured against unauthorized access.

Software application may be installed on each of the mobile devices. Software application includes authentication module 114, tracking module 116 and throttling module 118. Authentication module 114 may authenticate a user when logging onto the app 102 on any of the mobile devices. Tracking module 116 may determine a number of the mobile devices that are within range to the mobile device that is attempting to access app 102. Throttling module 118 may retrieve the data tracking module 116 gathered and adjust operation of app 102.

Figure 4:
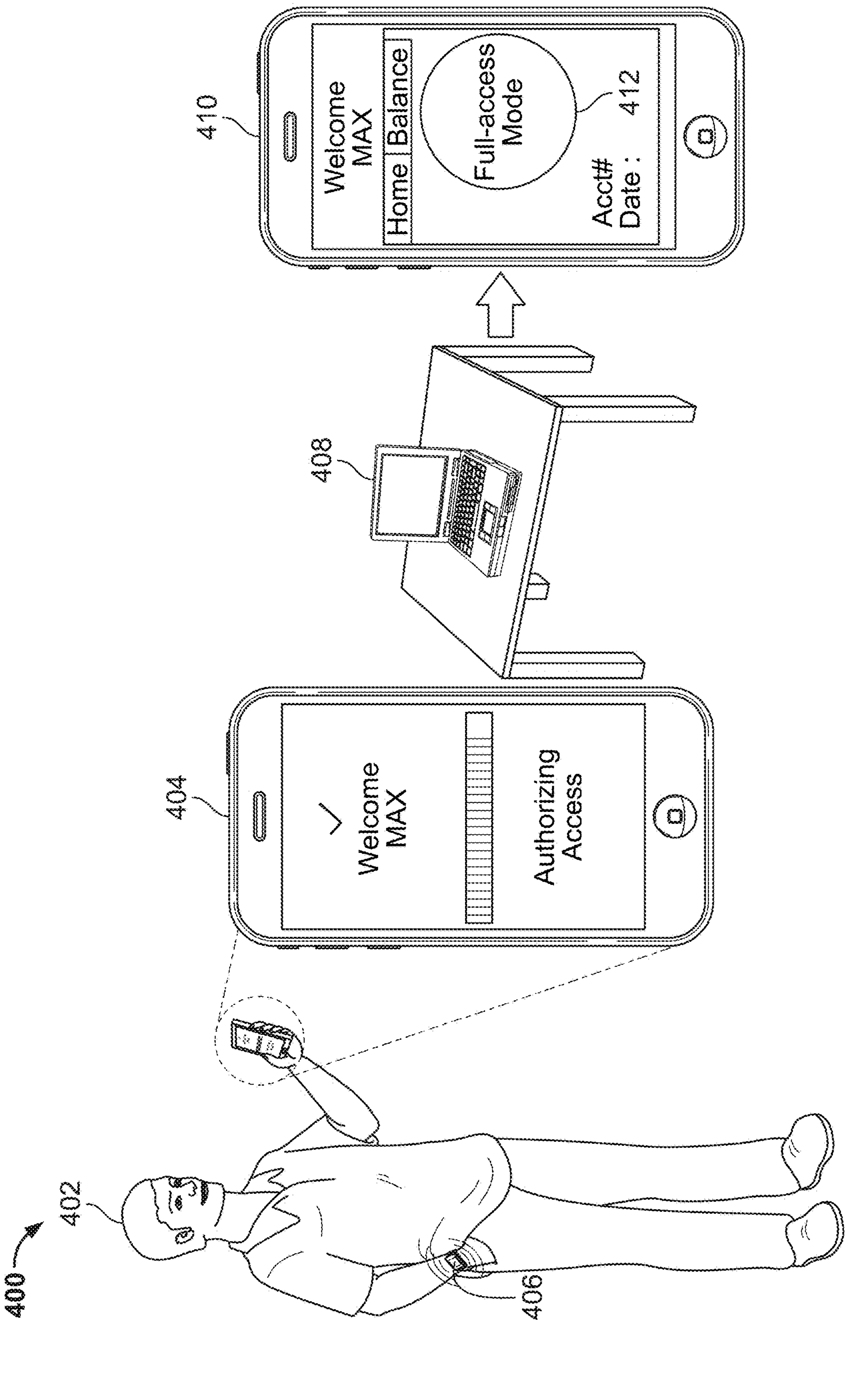
FIG. 4 shows an illustrative diagram in accordance with principles of the disclosure.

FIG. 4 shows an illustrative exemplary diagram 400.

User 402 may possess multiple mobile devices. User 402 may be holding smartphone 404 to access app 102. Smartphone 404 displays a UI of app 102. The UI is showing that 'Max' is logged into app 102. However, 'Max' may not have access to app 102 until mobile devices of user 402 are identified and tracked.

UI of smartphone 404 displays a loading bar. The loading bar represents a percentage of completion for determining authorization of a level of access for user 402 to app 102. The determination for access is being performed by authorization module 114 and tracking module 116.

Authorization module 114 may confirm, via one of user 402 captured biometrics, that user 402 is indeed 'Max.' Following authorization, tracking module 116 may track each of the user's mobile devices to identify a location of each mobile device. Smartwatch 406 may be a first mobile device determined to be within range to smartphone 404. Additionally, laptop 408 is a second mobile device determined to be within range to smartphone 404.

Because two devices are determined to be within range of smartphone 404, throttling module 118 may authorize user 402 to full-access mode 412 within app 102, as shown at 410.

Figure 5:
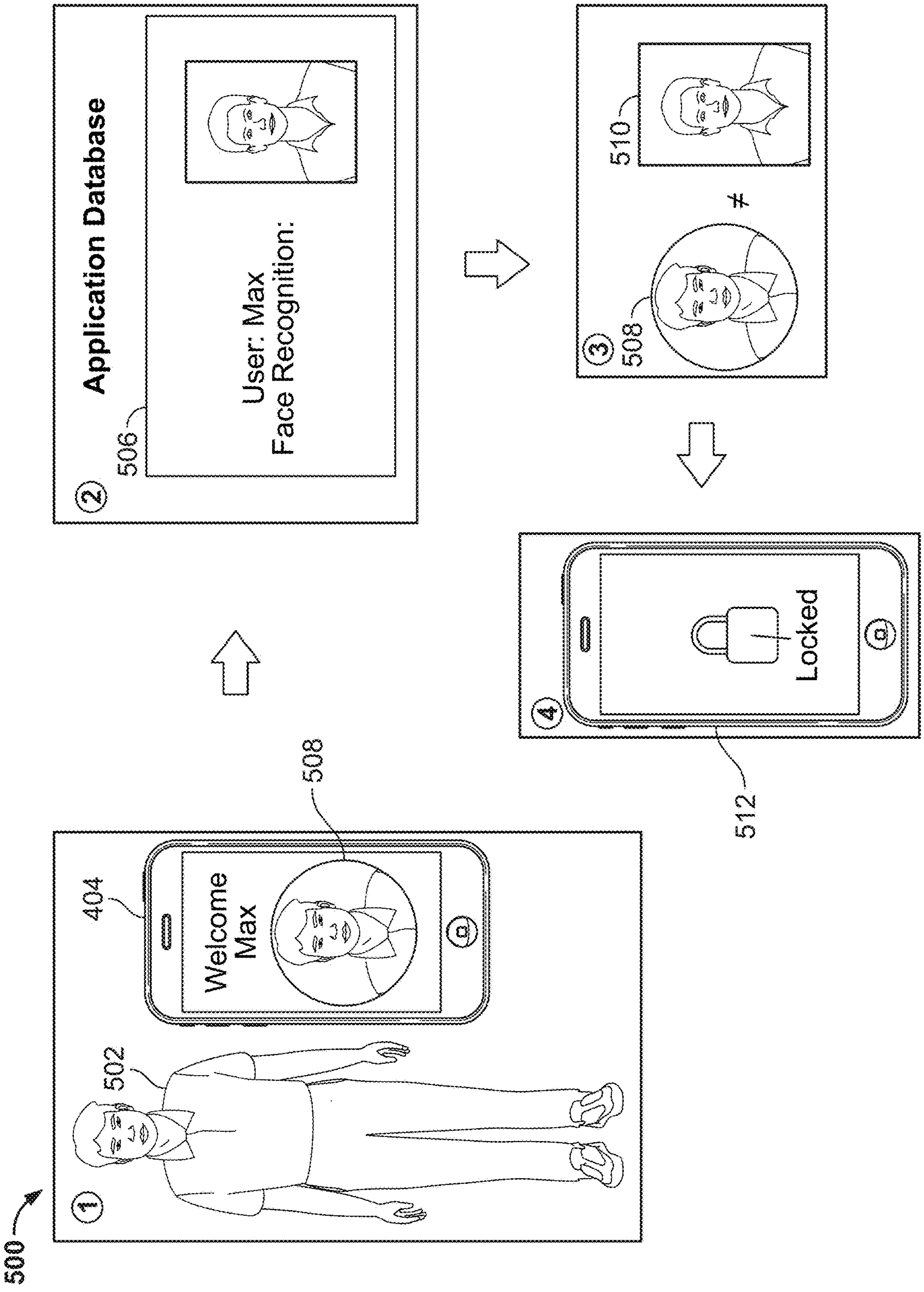
FIG. 5 shows an illustrative flow diagram in accordance with principles of the disclosure.

FIG. 5 shows an illustrative flow diagram 500. In FIG. 5 at step 1, a user 502 is shown holding smartphone 404. User 502 has successfully logged into app 102 as shown on UI of smartphone 404. It should be appreciated that user 502 may have successfully logged into app 102 however access to app 102 may not be available until biometric authentication has been successfully authenticated.

Prior to user-access to App 102, biometric authentication may be required. Following authentication of a biometric of a user, the number of devices within range may enable a determination of a level of user-access to App 102.

At step 1, smartphone 504 captures an image of the face of user 502.

At step 2, application database 506 is shown displaying account information of user 'Max'. 'Max' is the owner of smartphone 404. An image of 'Max' may be stored within a user profile in application database 506. The image of 'Max' may be retrieved for comparing to the captured image.

At step 3, captured image 508 is compared to the image of 'Max' 510 retrieved from database 506. Authentication module 114 may perform the comparison and determine that image 508 is not equal to image 510. This may indicate that user 502 is not the owner of smartphone 504. User 502 may have stolen smartphone 504. In order to protect the data within the app 102, user 502 may be denied access to app 102.

At step 4, because authentication module 114 is not able to verify user 502, user 502 may not have access to app 102. App 102 may be locked on smartphone 404. In some embodiments, smartphone 404 may be locked and no activity may be performed.

Figure 6:
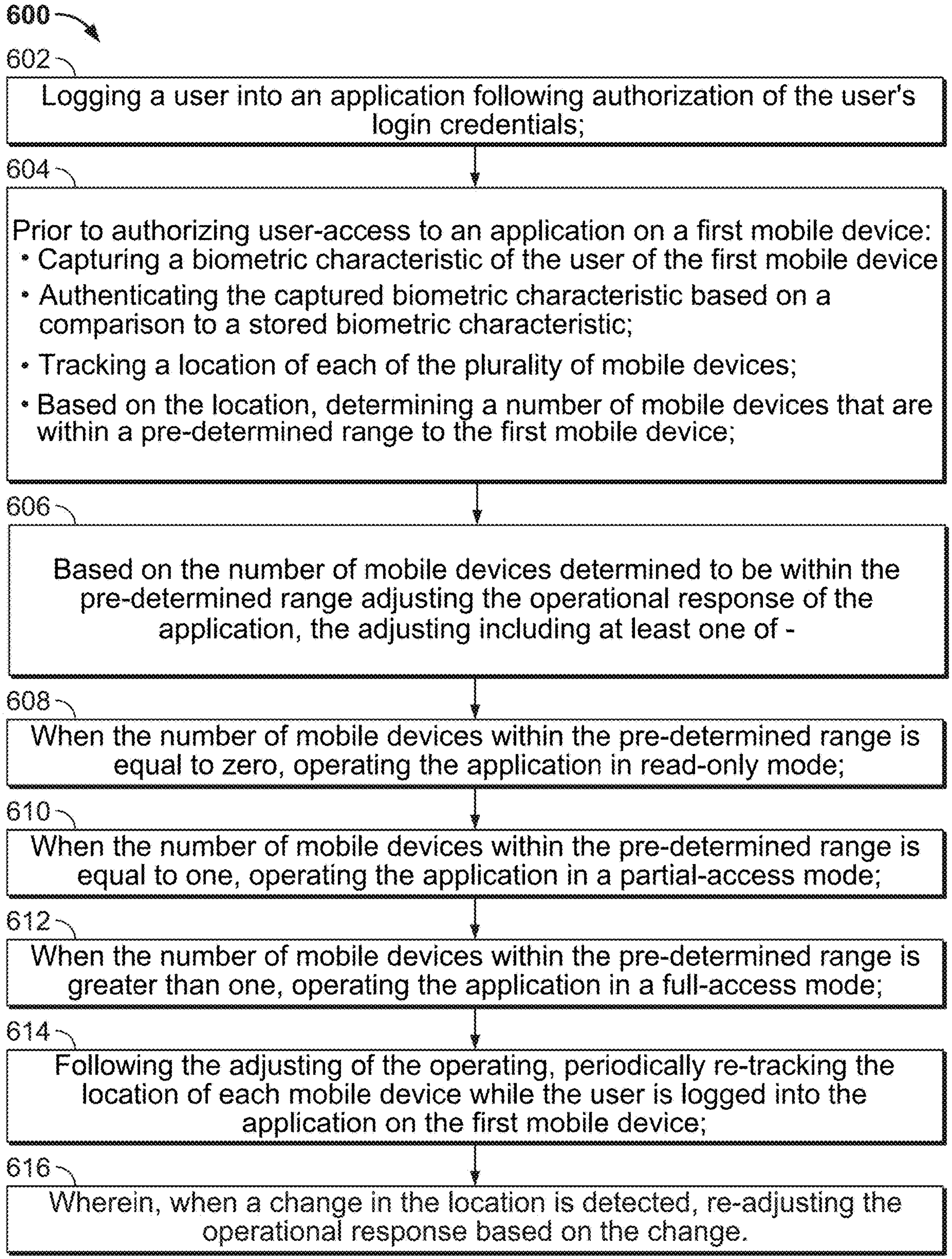
FIG. 6 shows an illustrative flow chart in accordance with principles of the disclosure.

FIG. 6 shows an illustrative flow chart 600 of method steps for dynamically adjusting an operational response of an application running on a first mobile device.

At step 602, method steps may include logging a user into an application following authorization of the user's login credentials.

At step 604, prior to authorizing user-access to the application on the first mobile device, a number of steps may be performed. The first step may include, capturing a biometric characteristic of a user of the first mobile device. The second step may include comparing the captured biometric characteristic to a biometric characteristic stored in a user profile within the application. The third step may include authenticating the captured biometric characteristic based on the comparison. The fourth step may include, when the user's biometric characteristic is authenticated, tracking a location of each of the plurality of mobile devices in comparison to the first mobile device. The fifth step may include, based on the location of each device, determining a number of mobile devices that are within a pre-determined range to the first mobile device.

At step 606, based on the number of mobile devices determined to be within the pre-determined range, adjusting the operational response of the application. The operational response may provide a mode of user-access to the application.

The adjusting may include at least one of steps 608, 610 and 612.

At step 608, when the number of mobile devices within the pre-determined range is equal to zero, the method step may include operating the application in read-only mode.

At step 610, when the number of mobile devices within the pre-determined range is equal to one, the method step may include operating the application in a partial-access mode.

At step 612, when the number of mobile devices within the pre-determined range is greater than one, the method step may include operating the application in a full-access mode.

At step 614, following the adjusting of the operating of the application using at least one of steps 608-612, the method step may include periodically re-tracking the location of each mobile device while the user is logged into the application on the first mobile device, as shown at 614.

At step 616, when a change in the location of any one of the mobile devices is detected, the method step may include re-adjusting the operational response based on the change.

Figure 7:
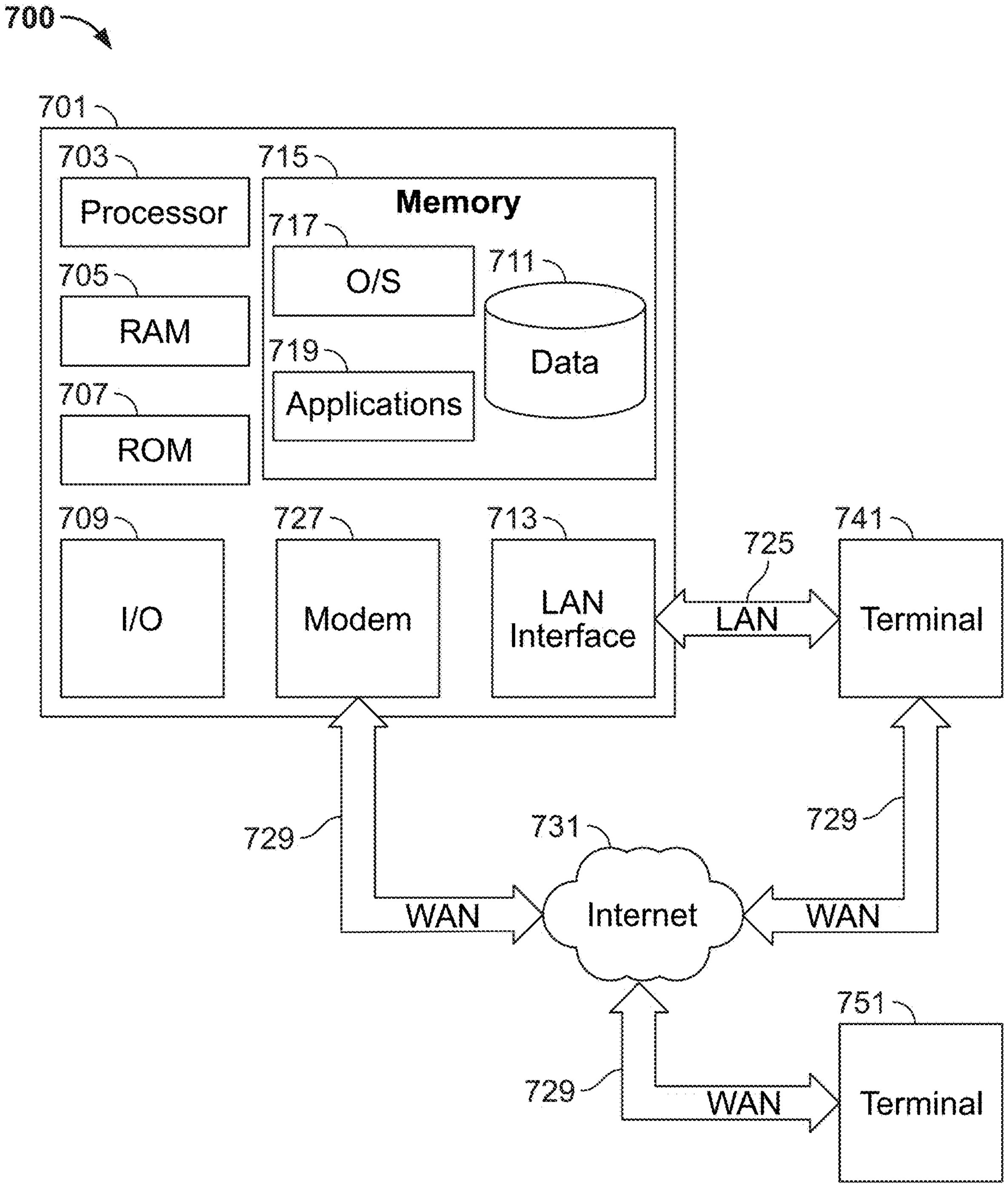
FIG. 7 shows an illustrative block diagram of apparatus in accordance with the invention.

FIG. 7 shows an illustrative block diagram of system 700 that includes computer 701. Computer 701 may alternatively be referred to herein as an "engine," "server" or a "computing device." Computer 701 may be a workstation, desktop, laptop, tablet, smart phone, or any other suitable computing device. Elements of system 700, including computer 701, may be used to implement various aspects of the systems and methods disclosed herein. Each of application 102, smartphone 104, tablet 106, laptop 108, PDA 110, smartwatch 112, UI 302, smartphone 404. Smartwatch 406, laptop 408, application database, may include some or all of the elements and apparatus of system 700. Furthermore, each of the method steps illustrated in FIG. 6 may be performed using one or more of the elements and apparatus of system 700.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. The processor 703 may also execute all software running on the computer—e.g., the operating system and/or voice recognition software including authentication module 114, tracking module 116 and throttling module 118. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 717 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701. When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application program(s) 719 may include computer executable instructions (alternatively referred to as "programs"). The computer executable instructions may be embodied in hardware or firmware (not shown). The computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 611, and any other suitable information, may be stored in memory 715. One or more of applications 719 may include one or more algorithms that may be used to implement features of the disclosure including the tracking of the location of each of the mobile devices, identifying a change in location of any one of the mobile devices and throttling the operational response of the application based on the number of mobile devices within close range to a first mobile device.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 601 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 8:
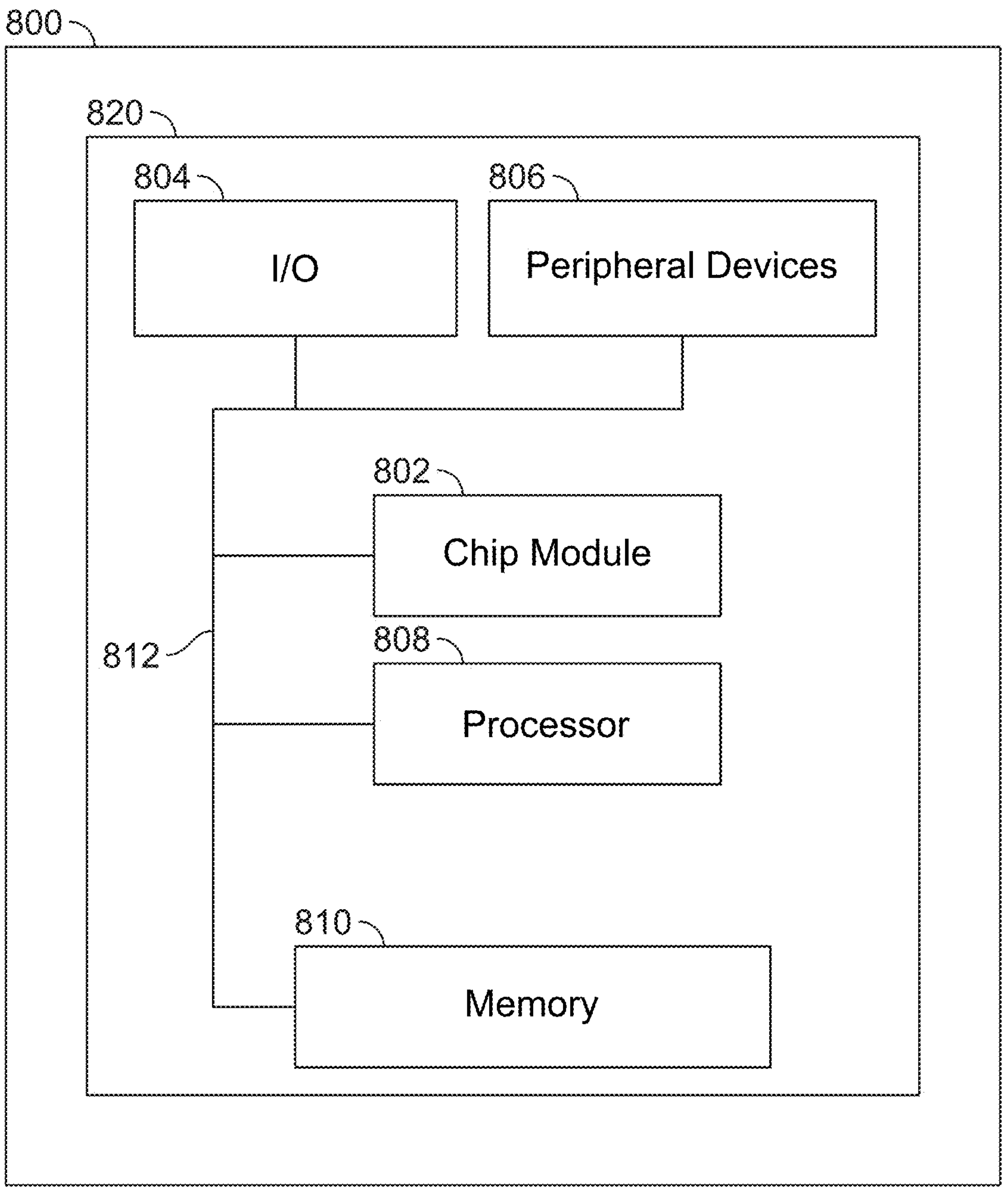
FIG. 8 shows an illustrative apparatus that may be configured in accordance with the invention.

FIG. 8 shows illustrative apparatus 800 that may be configured in accordance with the principles of the disclosure. Apparatus 800 may be a computing device. Apparatus 800 may include one or more features of the apparatus shown in FIG. 1 and FIG. 2. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 819, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Thus, systems and methods for dynamically adjusting an operational response of an application running on a mobile device is provided. Persons skilled in the art will appreciate that the present invention can be practiced by other than the described embodiments, which are presented for purposes of illustration rather than of limitation.

What is claimed is:

1. A system that dynamically adjusts an operation of software running on a first mobile device, the first mobile device from a plurality of mobile devices, the system comprising:

an application configured to provide access to a protected service, the application configured to store a pre-defined range of acceptable locations for each of the plurality of mobile devices;

an authentication module configured to:

authorize a user's login credentials received for logging into the application on the first mobile device;

capture a biometric characteristic of the user of the first mobile device and compare the captured biometric characteristic to a biometric characteristic stored in a user profile within the application; and in response to a determination that the captured biometric characteristic matches the biometric characteristic stored in the user profile, authenticate the captured biometric characteristic;

a tracking module configured to:

track a location of each of the plurality of mobile devices; and based on the location:

determine a number of mobile devices that are within a pre-determined range to the location of the first mobile device; and determine a number of mobile devices that are outside the pre-determined range to the location of the first mobile device;

a throttling module configured to adjust the operation of the application based on the number of mobile devices determined to be within the pre-determined range and outside the pre-determined range, the adjusting comprising:

when the number of mobile devices within the pre-determined range is equal to zero, operating the application in read-only mode;

when the number of mobile devices within the pre-determined range is equal to one, operating the application in a partial-access mode;

when the number of mobile devices within the pre-determined range is greater than one, operating the application in a full-access mode; and when any one or more mobile devices are determined to be outside the predetermined range of the location of the first mobile device:

compare the location to the pre-defined range of acceptable locations;

when one or more mobile devices are within the pre-defined range of acceptable locations, readjust the number of mobile devices to include the one or more mobile devices that are within the pre-defined range of acceptable locations; and when one or more mobile devices are outside the pre-defined range of acceptable locations:

deny user-access to the application from the one or more mobile devices determined to be outside the pre-defined range of acceptable locations; and transmit an electronic communication to the user of the first mobile device alerting the user of the one or more mobile devices determined to be outside the pre-defined range of acceptable locations;

the tracking module further configured to periodically re-track the location of each of the plurality of mobile devices while the user is logged into the application on the first mobile device; and the throttling module further configured to, when a change in the location is detected, re-adjust the operation based on the change.

2. The system of claim 1 wherein, in response to a determination that the captured biometric characteristic does not match the biometric characteristic stored in the user profile, the authentication module is configured to log the user out of the application on the first mobile device and deny user-access to the application on the first mobile device.

3. The system of claim 2 wherein the authentication module is further configured to:

transmit an electronic communication to an accountholder of the user-account alerting the accountholder of a discrepancy between the captured biometric characteristic and biometric characteristic store in the user profile;

receive a confirmation of an accuracy of the discrepancy; and maintain denial of user-access to the user account pending receipt of a matching biometric characteristic.

4. The system of claim 1 wherein the first mobile device and the plurality of mobile devices are linked to the application following a registering of each of the plurality of mobile devices to the application.

5. The system of claim 1 wherein the first mobile device and the plurality of mobile devices are linked to the application following a registering of each of the plurality of mobile devices to the application.

6. The system of claim 5 wherein the registering of the first mobile device and each of the plurality of mobile devices further comprises:

pairing each mobile device to the application;

generating a profile for each mobile device, the profile comprising a pre-defined range of acceptable locations for each mobile device and an authentication ID for each mobile device; and storing the profile in an application database together within the user profile.

7. The system of claim 6 wherein the pairing is performed via one of wireless fidelity ("WiFi"), Beacon and Bluetooth.

* * * * *